(12) United States Patent
Stelzl

(10) Patent No.: US 6,297,470 B1
(45) Date of Patent: Oct. 2, 2001

(54) ARRANGEMENT AND METHOD FOR PRODUCING EXPANDED MATERIAL

(75) Inventor: Thomas Stelzl, Vienna (AT)

(73) Assignee: Inter-Caylaian Anstalt, Vienna (AT)

( * ) Notice: Subject to any disclaimer, the term of this patent is extended or adjusted under 35 U.S.C. 154(b) by 0 days.

(21) Appl. No.: 09/180,226

(22) PCT Filed: May 29, 1996

(86) PCT No.: PCT/EP96/02267

§ 371 Date: Nov. 3, 1998

§ 102(e) Date: Nov. 3, 1998

(87) PCT Pub. No.: WO97/41980

PCT Pub. Date: Nov. 13, 1997

(30) Foreign Application Priority Data

May 3, 1996 (AT) .......................................... 801/96
May 24, 1996 (AT) .......................................... 922196

(51) Int. Cl.[7] .................................................. B23K 10/00
(52) U.S. Cl. ................ 219/121.72; 219/121.39; 219/121.44; 219/121.58
(58) Field of Search ................ 219/121.39, 121.67, 219/121.72, 121.18, 121.58, 121.48, 121.76; 228/170; 266/58

(56) References Cited

U.S. PATENT DOCUMENTS

| | | | | |
|---|---|---|---|---|
| 4,266,112 | * | 5/1981 | Niedermeyer | 219/121.67 |
| 4,328,411 | | 5/1982 | Haller et al. | |
| 4,645,900 | * | 2/1987 | Heyden | 219/121.67 |
| 4,782,208 | * | 11/1988 | Withrow et al. | 219/121.72 |
| 5,083,487 | | 1/1992 | Croteau | |
| 5,382,802 | * | 1/1995 | Anabuki et al. | 219/121.83 |
| 5,532,451 | * | 7/1996 | La Rocca | 219/121.64 |

FOREIGN PATENT DOCUMENTS

| | | |
|---|---|---|
| 0340619 | 11/1989 | (EP) . |
| 59127987 | 7/1984 | (JP) . |
| 63192561 | 12/1988 | (JP) . |

* cited by examiner

*Primary Examiner*—Mark Paschall
(74) *Attorney, Agent, or Firm*—Sughrue, Mion, Zinn, Macpeak & Seas, PLLC

(57) ABSTRACT

In an arrangement for producing expanded material (8), in particular from foil-type webs (2) of metal, with a cutting device (3) for producing coherent strips of webs (5) of foil, and with an expanding device (6, 7) for expanding the web (5), the cutting device (3) comprises laser beam, water jet or electron beam (4)-emitting devices which are arranged substantially adjacent each other, transversely to the moving direction of the web (2), and which are controlled by a controlling device.

4 Claims, 1 Drawing Sheet

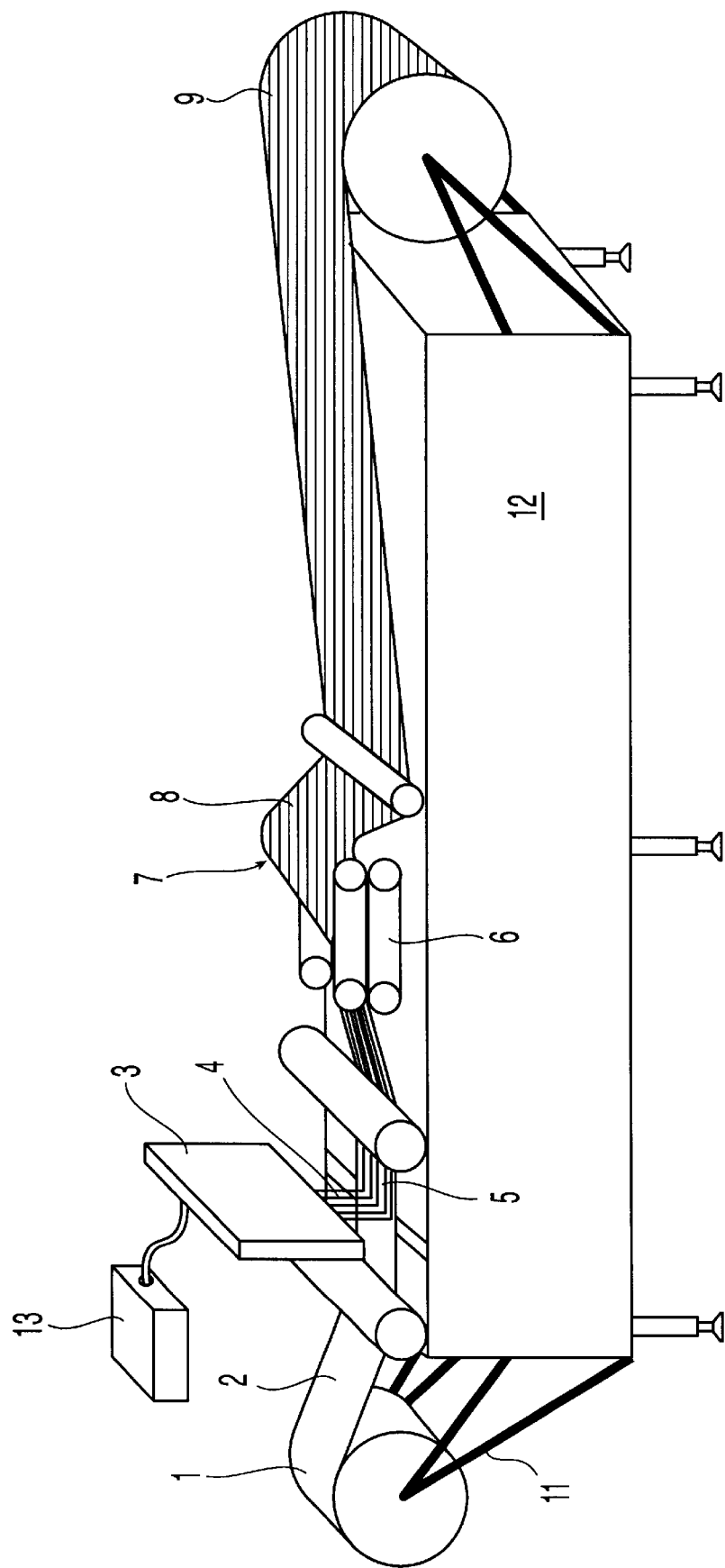

ARRANGEMENT AND METHOD FOR PRODUCING EXPANDED MATERIAL

The invention relates to an arrangement and a method for producing expanded material, in particular from foil-type webs of metal, with a cutting device for producing coherent strips of webs of foil, and with an expanding device for expanding the web.

Such an expanded material are metallic and/or non-metallic mono and/or multifilament composite honeycombs of flat carrier material. The composite honeycombs may, e.g., be formed of coated paper, rubber, aluminum, high-grade steel, noble metal, ceramics, or synthetic materials of any required module, elongation and strength (e.g. carbon fiber/aramide honeycombs for high-strength carrying structures).

The preferred material and/or composite strength of the foils of metallic and/or non-metallic flat goods needed therefor as well as the possible combination of these flat structures (composite materials) is between 25 and 90 $\mu$m.

The expanded material may be used as a climatic barrier, a heat exchanger, spacer, flame arrester, filter, insulator, explosion protection, surface enlargement, catalyst and the like.

Particularly for reducing the risk of explosions with fuel tanks and/or gas tanks (liquid gas) it has already been known to use such an expanded material of a certain aluminum alloy, where it is applied in such a manner that it is introduced in tanks as a coil (bales of meshwork) or in the form of round bodies of this meshwork, that it causes a substantial surface enlargement there, yet takes up only a few percent of the tank volume.

It has also become known that the hitherto used practice of employing only these certain aluminum alloys (other materials could not be processed on account of the production method to be cited therebelow), has been criticized by those applying such an explosion protection, because the material, aluminum, in practice has proven as not suitable for substantial fields of application on account of chemical or metallurgical disadvantages inherent therein.

Therefore, it is an essential demand of potential users that the material of the expanded material can be chosen in dependence on its purpose of use, i.e. depending on its use as an explosion protection in fuel and/or gas tanks, the substances to be transported or to be stored, and can be processed with the highest standards of cleanliness possible, since, on the user's side, it is sometimes clean rooms in which such expanded materials are introduced.

With the arrangements hitherto used, these requirements have not been taken into consideration.

An arrangement of this type is known e.g. from EP-B 340 619. There, the cutting unit is comprised of cooperating cutter drums which cut slits into the web of foil both in the transverse direction and in the longitudinal direction thereof at predetermined distances. The cutters of the cutter drums are self-sharpening and are subject to high wear requiring frequent exchange and thus a production stop of the plant. The material, and above all, the hardness of the cutters restrict the choice of material for the webs of foil to be processed. The dimensions of the cutting device of the prior art pre-determine the material, the thickness and the width of the foil as well as the arrangement of the slits. An adaptation to various requirements of practice, depending on the field of application, is not possible.

Moreover, when cutting with the cutter drums, chips and minute abrasion particles are incurred as waste, which is undesired in many of the above applications. E.g., they get into the fuel present in an explosion-protected tank and contaminate the filtering equipment, or if the fine particles are not retained by the filtering equipment, they get, e.g., into the pistons of a combustion engine, and cause excessive wear and finally the destruction of the combustion chamber there. Cutting by means of cutter drums also requires the presence of lubricants which must be removed after cutting, which, at reasonable expenditures, will be possible only to an incomplete extent and may lead to corrosion of the surface of the expanded material.

Thus, it is an object of the present invention to create an arrangement and provide a method of the initially defined type, in which the afore-mentioned disadvantages are no longer present. Processing of the most varying materials of arbitrary dimensions is to be possible in various variants.

According to the invention, it is suggested that in an arrangement of the initially defined type, the cutting device comprises laser beam, water jet or electron beam emitting devices which are arranged substantially adjacent each other, transversely to the moving direction of the web, and which are controlled by a controlling device.

When cutting by means of laser, e.g., chips and particles are not incurred, lubricants are not required. Depending on the properties of the material to be processed, such as, e.g., hardness and thickness, and on the desired properties of the processed end product, the cutting beams are adjusted via the controlling device. It is, of course, possible to adjust the length of the cuts via the controlling device.

Preferably, the laser beam, water jet or electron beam-emitting devices are individually positionable, or the laser beams, water jets or electron beams are orientable independent of each other so that the cuts can be made arbitrarily on the webs.

According to a preferred embodiment of the invention, the devices emitting the laser beams, water jets or electron beams are individually actuatable, thus rendering the width of the strips variable. If, e.g., every other beam or jet device is not in operation, the strip width will double.

With laser devices which are preferably to be employed, it is, in particular, also possible to produce a required beam grid for cutting not by a plurality of individual lasers, but to realize this grid in a more energy-saving manner by controllable deflecting optic devices (glass fiber etc.) which are fed by a single laser pulse. The laser beam-emitting devices are thus combined with controllable deflecting optic devices, in particular glass fibers, fed by a single laser-pulse-producing device.

Finally, the laser beam, water jet or electron beam-emitting devices preferably are adjustable independently of each other in terms of the energy emitted. The energy required will depend on the hardness and thickness of the material to be processed as well as from the desired slit width.

The pre-treated webs of foil thus provided with slits extending transversely and/or longitudinally to the moving direction are then formed to coilable bodies of expanded metal by spatial drawing up (expansion device).

Since in case of such a drawing procedure, the pre-treated (cut transversely to its longitudinal direction) web of foil not only is widened, but the web of foil simultaneously is shortened in the moving direction, it is essential that, with a continuously operating production apparatus comprising, in successive arrangement, cutting and expanding units interconnected by the same web of foil,—and only such an apparatus can be viewed as economically appropriate,—the passing speed of the web of foil will be lowered during the expansion procedure proper in relationship to the length reduction occurring in the web of foil as it is expanding.

Expanding itself is substantially effected in that the cut web of foil is held at its rims and is transported on, while in its middle it runs up on a ramp body upwardly directed at an acute angle relative to the plane of the cut web of foil, it also being possible to choose a continuous belt instead of the ramp body, which belt, to make sense, must have a round cross-section and which must consist of a material having a high frictional value relative to the material of the web of foil.

The most varying types of Reinolds conveying chains or toothed belt paths of synthetic material or toothed fabric belts whose surface is made of elastic material (caoutchouc, rubber etc.) may be used as the rim-side holding device for the web of foil. By exchanging the ramp body and appropriate speed control of the machine, changing of the various expansion factors of the web of foil is rendered possible.

In the enclosed drawing, one possible embodiment of the arrangement according to the invention is illustrated. From a foil coil 1 which is carried by a holding device 11, the untreated foil 2 is drawn off and fed to a processing table 12. Above the processing table 12, transversely to the moving direction of the web of foil 2, a cutting device 3 is arranged which comprises devices for emitting of laser beams, water jets or electron beams 4. The cutting device or the beam 4-emitting devices contained therein, respectively, are controlled by a controlling device 13. Via this controlling device 13 the position of the individual beam 4-emitting devices, the orientation of the beams 4, the activation of the individual devices, the intensity of the beams 4 and the cutting length of the beams 4 are adjustable. The foil 5 cut by the beams 4 is expanded by an expanding device comprised of rim-side retention devices 6 which simultaneoulsy provide for the advance of the cut web of foil 5 and of the expanded web of foil 8, and a ramp body 7 which in the present illustration is located below the expanded web of foil 8 shown, and which causes the expansion of the cut web of foil 5 into the expanded web of foil 8. The web of foil 8 cut and expanded in this manner is coiled up again on a coiling reel 9 into a coil.

What is claimed is:

1. An arrangement for producing expanded material, in particular from foil webs of metal, comprising: a cutting device for producing coherent strips of webs of foil; and an expanding device for expanding the web, wherein the cutting device comprises: a plurality of laser beam, water jet or electron-beam emitting devices which are arranged substantially adjacent each other transversely to the moving direction of the web; and a controlling device for individually controlling: the activation of the laser beam, water jet or electron beam emitting devices and the energy emitted by the laser beam, water jet or electron beam emitting devices.

2. An arrangement for producing expanded material according to claim 1, wherein the laser beam, water jet or electron beam-emitting devices are individually positionable, or the laser beams, water jets or electron-beam emitted by the laser beam, water jet or electron beam-emitting devices, respectively, are orientable in-dependent of each other.

3. An arrangement for producing expanded material according to claim 1, wherein the laser beam-emitting devices are connected with controllable deflecting optic devices, in particular glass fibres, which are fed by a single laser-pulse-generating device.

4. A method of producing expanded material, in particular for foil-type webs of metal, the method comprising:

cutting coherent strips of webs of foil by means of a cutting device, wherein the cutting is effected by means of a plurality of laser beams, water jets or electron beams whose sources are substantially adjacently arranged transversely to a moving direction of a web, wherein the activation of the laser beams, water jets or electron-beams, and the energy of the laser beams, water jets or electron-beams are individually controlled by a controlling device, in order to process varying materials of arbitrary dimensions in various variants; and subsequently subjection the cut webs of foil to a mono or double-axial expansion by means of an expanding device.

\* \* \* \* \*

UNITED STATES PATENT AND TRADEMARK OFFICE
CERTIFICATE OF CORRECTION

PATENT NO. : 6,297,470 B1
DATED : October 2, 2001
INVENTOR(S) : Thomas Stelzl

Page 1 of 1

It is certified that error appears in the above-identified patent and that said Letters Patent is hereby corrected as shown below:

Title page,
Item [73], Assignee, reads "Inter-Caylian Anstalt, Vaduz (FL)" should read
-- Inter-Caylaian Anstalt, Vienna (AT) --
Item [30], Foreign Application Priority Data, reads "May 24, 1996 (AT)   922196" should read -- May 24, 1996 (AT)   922/196 --

Signed and Sealed this

Fifteenth Day of February, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,297,470 B1 | Page 1 of 1 |
| APPLICATION NO. | : 09/180226 | |
| DATED | : October 2, 2001 | |
| INVENTOR(S) | : Thomas Stelzl | |

It is certified that error appears in the above-identified patent and that said Letters Patent is hereby corrected as shown below:

Title page,
Item [73], Assignee, reads "Inter-Caylian Anstalt, Vaduz (FL)" should read
-- Inter-Caylaian Anstalt, Vienna (AT) --
Item [30], Foreign Application Priority Data, reads "May 24, 1996 (AT)   922196" should read -- May 24, 1996 (AT)   922/96 --

This certificate supersedes Certificate of Correction issued February 15, 2005.

Signed and Sealed this

Fourteenth Day of November, 2006

JON W. DUDAS
*Director of the United States Patent and Trademark Office*